United States Patent [19]

Ooi et al.

[11] Patent Number: 4,554,587
[45] Date of Patent: Nov. 19, 1985

[54] IMAGE PICKUP APPARATUS

[75] Inventors: Kazushige Ooi, Sagamihara; Shigekazu Fujiwara, Kamakura; Nobuaki Yoshida, Tokyo; Tsuneo Sukegawa, Kawasaki, all of Japan

[73] Assignees: Tokyo Shibaura Denki Kabushiki Kaisha; Nippon Kogaku K.K., both of Tokyo, Japan

[21] Appl. No.: 467,884

[22] Filed: Feb. 18, 1983

[30] Foreign Application Priority Data

Feb. 22, 1982 [JP] Japan .................................. 57-26937

[51] Int. Cl.$^4$ ......................... H04N 5/14; H04N 5/19
[52] U.S. Cl. .................................... 358/228; 358/161; 358/162
[58] Field of Search ............... 358/228, 219, 161, 162, 358/168

[56] References Cited

U.S. PATENT DOCUMENTS

| | | | |
|---|---|---|---|
| 3,010,362 | 11/1961 | Smith | 358/228 |
| 3,576,393 | 4/1971 | Thompson | 358/228 |
| 3,691,302 | 9/1972 | Gaebele | 358/228 |
| 4,141,043 | 2/1979 | Liu | 358/228 |

FOREIGN PATENT DOCUMENTS

| | | | |
|---|---|---|---|
| 1128461 | 4/1962 | Fed. Rep. of Germany | 358/228 |
| 1927969 | 12/1972 | Fed. Rep. of Germany | |

*Primary Examiner*—Tommy P. Chin
*Attorney, Agent, or Firm*—Cushman, Darby & Cushman

[57] ABSTRACT

An image pickup apparatus such as a video camera including a pickup tube, a diaphragm mechanism and an electrochromic filter plate which are disposed along the optical path of incident image light on the pickup tube. When an illuminance of an object to be photographed is lower than a predetermined illuminance, only the diaphragm mechanism is used to suitably control an exposure of the pickup tube. However, when the illuminance of the object exceeds the predetermined illuminance level, the diaphragm mechanism is operated to keep its aperture size at a predetermined aperture size which is larger than an original minimum aperture size corresponding to a pinhole state. At the same time, the electrochromic filter plate continuously changes its light transmissivity in response to an aperture control signal, thereby controlling the exposure of the pickup tube.

15 Claims, 6 Drawing Figures

IMAGE PICKUP APPARATUS

BACKGROUND OF THE INVENTION

The present invention relates to an image pickup apparatus and, more particularly, to an image pickup apparatus such as a video camera which has a diaphragm mechanism for properly adjusting the amount of light incident on an image pickup element.

In an image pickup apparatus such as a video camera which has an image pickup element therein, it is quite common to use a mechanical diaphragm mechanism for adjusting the amount of light incident on the image pickup element through a lens in accordance with the brightness of an object to be photographed. Since the dynamic range of the image pickup element of a video camera is relatively narrow, a diaphragm mechanism must inevitably be used (especially in a video camera) to control the amount of light so as to obtain good image quality.

The diaphragm is closed to a suitable extent to achieve a proper exposure when an object to be photographed is bright (i.e., the illuminance of the object is high). And, when the object is dark (i.e., the illuminance of the object is low), the diaphragm is opened wide. Therefore, when the object illuminance is too high, for example, when the user wishes to take a picture of a snow scene in sunshine, the diaphragm mechanism of the conventional video camera simply closes the diaphragm. As a result, the diaphragm of the diaphragm mechanism is closed like a pinhole, and an undesirable "pinhole effect" occurs. When the diaphragm is fully closed like a pinhole, the depth of field is too deep, so that it is very difficult to properly focus the lens on the object using an electronic viewfinder of the video camera. Even if the distance between the video camera and the object does not change, when the illuminance of an object becomes low, proper focusing cannot be performed when focusing is adjusted for the dark object. Especially, when the user wishes to continuously take pictures of a moving object, the pictures of the moving object may be out of focus when the object illuminance is abruptly decreased, thus degrading the image quality of the object.

Furthermore, according to the conventional image pickup apparatus which has a diaphragm for simply changing the numerical aperture in accordance with the object illuminance, when the user takes a very bright scene (e.g., BV=12), scratches and dust on the surface of the image pickup element or the lens, and/or in the optical path are undesirably photographed due to the "pinhole effect" caused by excessive closing of the diaphragm. In this condition, the gain (transmissivity characteristics) of the diaphragm mechanism with respect to a change in the amount of image light passing therethrough is undesirably increased to a much greater extent than it is in any other condition. Therefore, in the above condition, the control circuit system of the image pickup apparatus becomes unstable, thus resulting in the "hunting" phenomenon.

SUMMARY OF THE INVENTION

It is, therefore, an object of the present invention to provide a new and improved image pickup apparatus for properly photographing an object in order to obtain good image quality under conditions in which the illuminance of the object changes over a wide range.

In order to achieve the above object of the present invention, there is provided an image pickup apparatus, comprising: an image sensing element which has an image pickup surface for sensing incident light from an image; a mechanical diaphragm mechanism and an electrochromic filter which are disposed in front of the image sensing element along an optical path; and an exposure control device for controlling the diaphragm mechanism and the electrochromic filter. The diaphragm mechanism is operated to continuously change the aperture size between a maximum aperture size where the diaphragm is fully opened and a predetermined aperture size. The predetermined aperture size is defined as an effective minimum aperture size. The electrochromic filter has a layer which comprises an electrochromic material for continuously changing its transmissivity in accordance with a voltage applied thereto. The exposure control device causes the diaphragm mechanism to operate so as to control the amount of light incident on the image sensing element when the illuminance level of the incident light falls within a first illuminance range which is lower than a predetermined illuminance level. However, when the illuminance level of the light actually incident on the image sensing element falls within a second illuminance level which is equal to or higher than the predetermined illuminance level, the exposure control device performs the exposure control using the electrochromic filter. Meanwhile, the size of the diaphragm of the aperture mechanism is fixed to correspond to the predetermined aperture size.

BRIEF DESCRIPTION OF THE DRAWINGS

The present invention is best understood by reference to the accompanying drawings, in which.

DETAILED DESCRIPTION OF THE PREFRRRED EMBODIMENT

Figure 1:
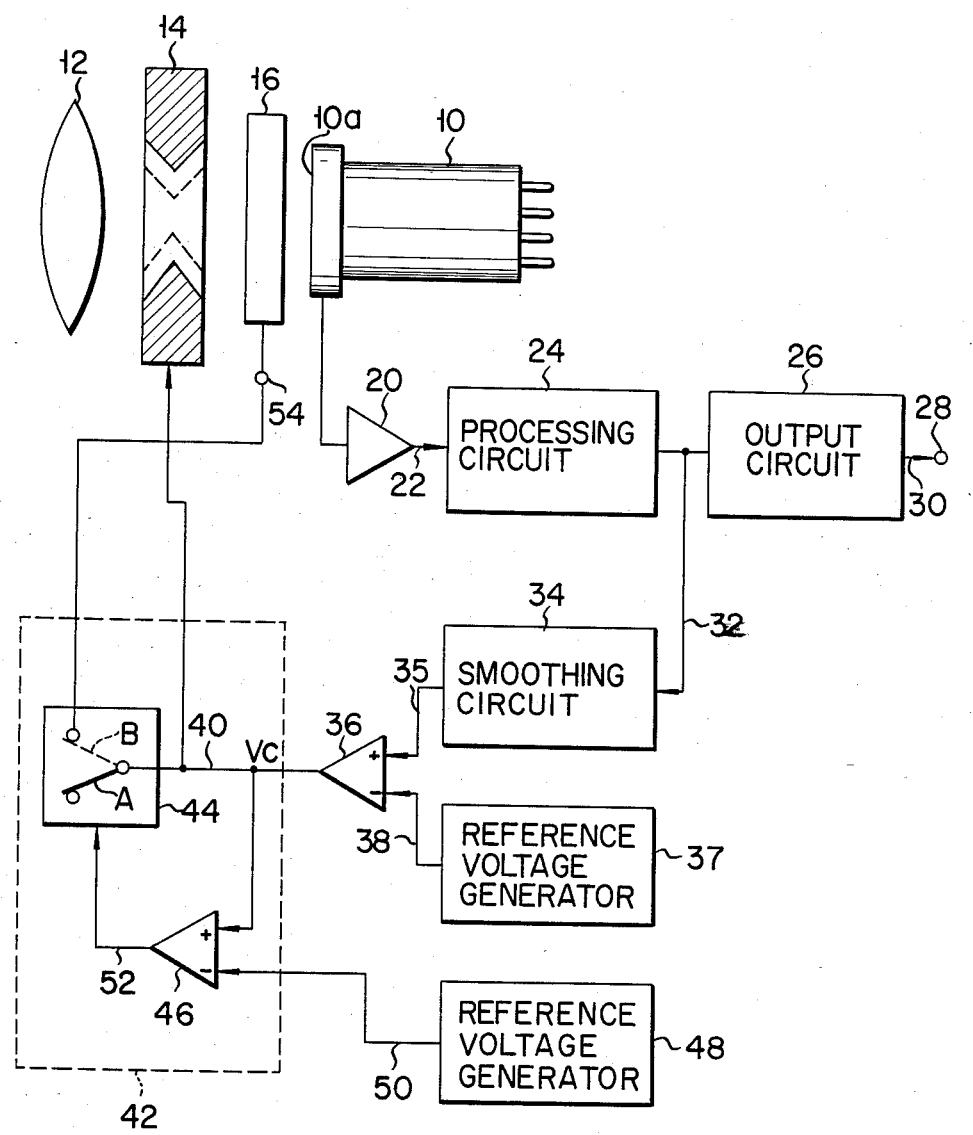
FIG. 1 is a block diagram showing the overall configuration of a video camera as the image pickup apparatus according to an embodiment of the present invention.

Referring now to FIG. 1, a video camera for a known video tape recorder as an image pickup apparatus according to an embodiment of the present invention is schematically illustrated. An image pickup tube 10 is built into the video camera shown in FIG. 1 to serve as an image sensing element. A mechanical diaphragm mechanism 14 and an electrochromic element 16 which serves as a transmissivity (or transmittance) variable filter are provided between an image pickup surface 10a of the image pickup tube 10 and a lens 12. The diaphragm mechanism 14 is arranged to continuously change an aperture size within a certain range between a maximum aperture size corresponding to a fully opened diaphragm state and a minimum aperture size corresponding to an almost closed diaphragm state. The size of the minimum aperture size is greater than that of an aperture size where the diaphragm is fully closed like a pinhole. The minimum aperture size is about 10% of the maximum aperture size in this embodiment. The diaphragm of the diaphragm mechanism 14 is prevented from being closed smaller than the minimum aperture size, that is, about 10% of the maximum aperture size. The amount or intensity of light incident on the surface 10a of the pickup tube 10 through the lens 12 and the diaphragm mechanism 14 can be continuously adjusted in accordance with the aperture size of the diaphragm mechanism 14.

The electrochromic element (to be referred to as an electrochromic filter plate hereinafter) 16 comprises a flat plate. The electrochromic filter plate 16 is disposed between the diaphragm mechanism 14 and the surface 10a of the pickup tube 10 along an optical path of the light incident on the pickup tube 10. Therefore, the image light incident on the lens 12 passes through the diaphragm mechanism 14 and then the electrochromic filter plate 16, and an image is formed on the surface 10a of the pickup tube.

Figure 2A:
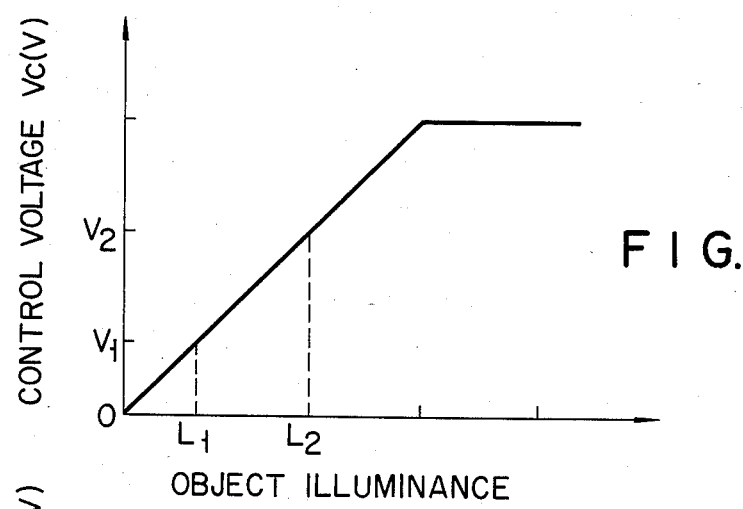
FIG. 2A is a graph for explaining the control voltage Vc of an aperture control signal as a function of the illuminance of an object to be photographed by the video camera shown in FIG. 1.

An image signal current from the pickup tube 10 is amplified by a preamplifier 20 which then produces an image signal 22 having a predetermined voltage level. The preamplifier 20 which produces the image signal 22 is connected, through a processing circuit 24 and an output circuit 26, to an output terminal 28. Therefore, the image signal 22 is supplied to the output circuit 26 through the processing circuit 24 in a manner known to a person skilled in the art. A final video signal 30 is produced by the output circuit 26. In this condition, a video signal 32, which is DC clamped and produced by the processing circuit 24 to indicate the intensity of light actually incident on the pickup tube 10, is supplied to a smoothing circuit 34. The smoothing circuit 34 eliminates ripple components from the video signal 32, and the video signal 32 is DC rectified. The output terminal of the smoothing circuit 34 is connected to the first input terminal (non-inverting input terminal) of an operational amplifier (differential amplifier) 36. A video signal (to be referred to as an object illuminance detection signal hereinafter) 35 which is DC rectified by the smoothing circuit 34 is supplied to the first input terminal of the operational amplifier 36. A reference voltage generator 37 is connected to the second input terminal (inverting input terminal) of the operational amplifier 36. The reference voltage generator 37 is arranged to generate a reference voltage signal 38 which has a specific potential level corresponding to the predetermined illuminance level of light incident on the pickup tube 10. The operational amplifier 36 compares the reference voltage signal 38 and the object illuminance detection signal 35 from the smoothing circuit 34. The operational amplifier 36 then generates an output voltage signal 40 for permitting a potential difference between the signals to be compensated to a zero level. The output voltage signal 40 then serves as an aperture control signal for determining a change in the aperture size of the diaphragm mechanism 14. The signal 40 has a control voltage level Vc which changes in accordance with the actual object illuminance or the illuminance of image light incident on the image pickup tube 10, as shown in FIG. 2A.

Figure 2B:
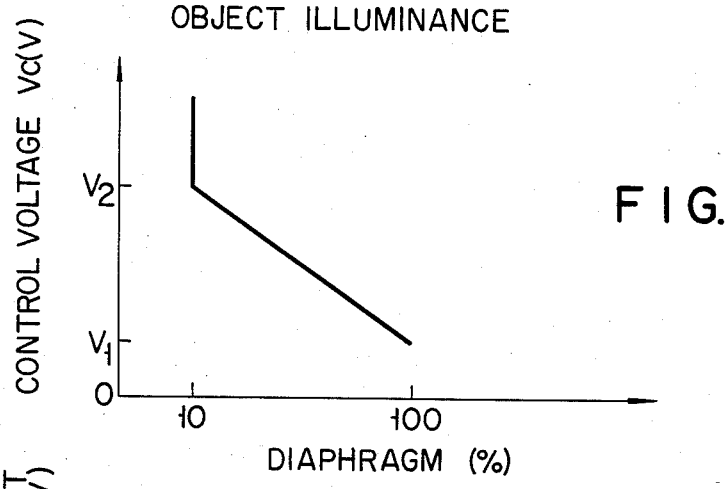
FIG. 2B is a graph for explaining the control voltage Vc of the aperture control signal as a function of the diaphragm of the diaphragm mechanism shown in FIG. 1.

The aperture control signal 40 is supplied to an incident light amount control circuit 42. The incident light amount control circuit 42 includes an analog switch 44 and a voltage comparator 46. The output terminal of the operational amplifier 36 is connected to the diaphragm mechanism 14, the analog switch 44, and the first input terminal of the voltage comparator 46. When the diaphragm mechanism 14 receives the aperture control signal 40, the diaphragm mechanism 14 is actuated to continuously change its aperture size in accordance with the characteristic curve shown in FIG. 2B. In other words, when the diaphragm mechanism 14 receives the signal 40 having a voltage $V_1$ for permitting a difference between the reference illuminance and the actual object illuminance $L_1$ to be compensated to a zero level, the diaphragm mechanism 14 is operated to change the aperture size to 100%, that is, to obtain the maximum aperture size by fully opening the diaphragm. When the actual object illuminance is $L_2$, the aperture control signal 40 has a voltage $V_2$ so as to permit a difference therebetween to be compensated to a zero level, as shown in FIG. 2A. In this case, the diaphragm mechanism 14 is operated to close the diaphragm to the minimum aperture size, that is, 10% of the maximum aperture size. Even if the actual object illuminance is greater than the illuminance $L_2$, the minimum aperture size is kept unchanged. In this embodiment, the minimum aperture size is set at 10% of the maximum aperture size, so that a decrease in the aperture size to a value less than 10% is prevented.

A reference voltage generator 48 is connected to the second input terminal of the voltage comparator 46. The reference voltage generator 48 supplies a reference voltage signal 50 to the second input terminal of the voltage comparator 46. The reference voltage signal 50 has a predetermined potential level equal to that of an aperture control signal voltage $V_2$ corresponding to the minimum aperture size (10% of the maximum aperture size) of the diaphragm mechanism 14. The voltage comparator 46 compares the aperture control signal 40 from the operational amplifier 36 and the reference voltage signal 50 and generates a comparison signal 52. When the signal level of the aperture control signal 40 is lower than that of the reference voltage signal 50, the comparison signal 52 has a low logic level $V_L$. However, when the signal level of the aperture control signal 40 is equal to or higher than that of the reference voltage signal 50, the comparison signal 52 generated from the voltage comparator 46 has a high logic level $V_H$.

The analog switch 44 which receives the aperture control signal 40 from the operational amplifier 36 at its input terminal performs switching operation in response to the signal 52 from the voltage comparator 46. In the embodiment shown in FIG. 1, when the voltage comparator 46 produces the comparison signal 52 having the low logic level $V_L$, the movable contact of the analog switch 44 is connected to one stationary contact as indicated by solid line A, in FIG. 1. Therefore, the analog switch 44 prevents the aperture control signal 40 supplied from the operational amplifier 36 from being supplied to the electrochromic filter plate 16. When the comparison signal 52 from the comparator 46 has a high level $V_H$, the movable contact of the analog switch 44 is connected to the other stationary contact thereof, as indicated by the dotted line B in FIG. 1. In this case, the aperture control signal 40 is then supplied to the electrochromic filter plate 16 through the analog switch 44 and a terminal 54. Thus, an electric field is formed in the electrochromic filter plate 16 to have an intensity corresponding to that of the aperture control signal 40. The electrochromic filter plate 16 changes its color density in accordance with the electric field, thereby changing its light transmissivity. Meanwhile, the aperture of the diaphragm mechanism 14 is forcibly locked at the minimum aperture size, that is, 10% of the maximum aperture size in this embodiment. It should be noted that the minimum aperture size of the diaphragm mechanism 14 is not limited to the aforementioned value, but may be properly changed within a range of several % to 30%, as needed.

An electrochromic element described in Japanese Patent Disclosure (KOKAI) No. 56-4679 may be preferably used as the electrochromic filter plate 16 in the image pickup apparatus shown in FIG. 1. The electrochromic element is an all-solid-state optical filter element which changes its light transmittance in accordance with the control voltage Vc. The electrochromic filter plate 16 is shown in FIG. 3.

Figure 3:
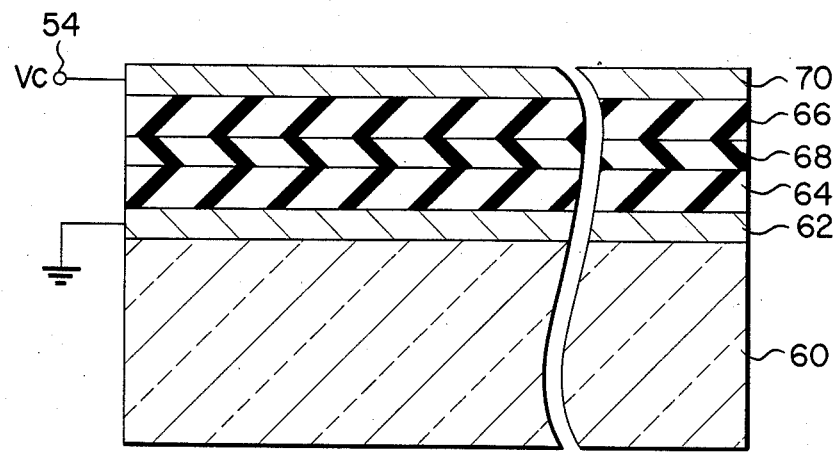
FIG. 3 is a sectional view of an electrochromic filter plate arranged in the video camera in FIG. 1.

Referring to FIG. 3, the electrochromic filter plate 16 has a glass substrate 60. A first transparent electrode 62 is formed on the top surface of the glass substrate 60 so as to have a predetermined uniform thickness. A first electrochromic layer 64 which comprises a solid electrochromic material such as $Ir(OH)_x$ or $Ni(OH)_x$ is formed on the first transparent electrode 62. A second electrochromic layer 66 which comprises a solid electrochromic material such as $WO_3$ or $MoO_3$ is formed above the first electrochromic layer 64 through an insulating film 68 which comprises an electrical insulating material such as $Ta_2O_5$ or $SiO_2$. The first and second electrochromic layers are illustrated by insulator hatching for illustrative convenience in FIG. 3. A second transparent layer 70 is formed on the second electrochromic layer 66 and is connected to a control voltage input terminal 51. A total thickness of the films 62, 64, 66, 68 and 70 is as small as 2 to 3 $\mu$m. However, the glass substrate 60 has a thickness of 0.1 to 10 mm, preferably 0.5 mm in this embodiment. Therefore, the thickness of the electrochromic filter plate 16 is substantially determined by the thickness of the glass substrate 60.

Figure 4:
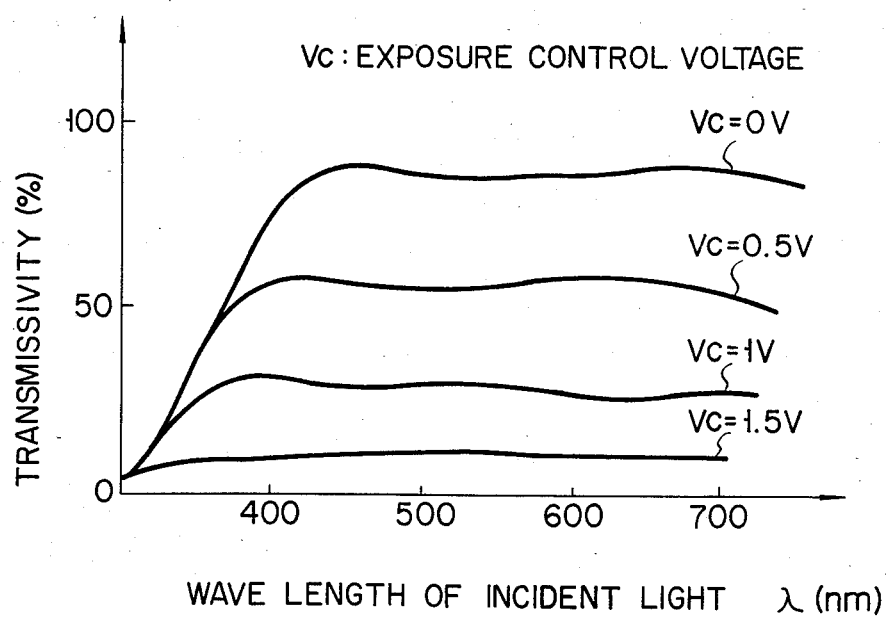
FIG. 4 is a graph for explaining the transmissivity of the electrochromic filter plate shown in FIG. 3 as a function of the wavelength of incident light, using the control voltage Vc of the aperture control signal as a parameter.

When the control voltage Vc is applied across the electrochromic filter plate 16 which has a structure as described above, the first and second electrochromic layers 64 and 66 are simultaneously colored in accordance with the electric field induced by the control voltage. Therefore, the electrochromic filter plate 16 is changed to have various color densities, thus changing its light transmittance. FIG. 4 is a graph in which changes in light transmissivity or transmittance as a function of the wavelength of the incident light are plotted using the control voltage as a parameter. The color density of the first and second electrochromic layers 64 and 66 is determined by the amount of charge generated in accordance with a voltage applied between the first and second transparent electrodes 62 and 70. When the applied voltage reaches an equilibrium, a current no longer flows between the first and second transparent electrodes 62 and 70. Therefore, the electrochromic filter plate 16 is electrically equivalent to a capacitor. Therefore, even if application of a voltage is interrupted in the above condition, the electrochromic filter plate 16 continues to operate until the charge is discharged to the outside. In other words, the electrochromic filter plate 16 serves as a memory. The color retention time (memory time) is determined by leakage current characteristics between the electrochromic filter plate 16 and the external circuit. According to the electrochromic filter plate 16 of the above embodiment shown in FIG. 3, the memory time is more than 10 hours. Therefore, other memory elements need not be used for general purposes.

The charge between the first and second transparent electrodes 62 and 70 must be removed in order to release the colored condition of the electrochromic filter plate 16 and cause the color generated in the filter plate 16 to disappear, thereby increasing its light transmissivity. For this purpose, a resistor is connected between the first and second transparent electrodes 62 and 70, or a reverse voltage is applied therebetween. When the reverse voltage is applied between the first and second transparent electrodes 62 and 70, the electrochromic filter plate 16 immediately causes the color generated therein to disappear and thus to have the maximum transmissivity. In this case, when the ambient temperature is decreased, the response time is prolonged. However, at room temperature, the response time for the transmissivity-changing operation of the filter plate 16 falls within a range of about several milliseconds to several tens of milliseconds. In this manner, the electrochromic filter plate 16 provides sufficient response characteristics as a transmissivity variable filter.

The exposure control operation of the video camera according to the embodiment of the present invention will be described hereinafter. The light transmissivity of the electrochromic filter plate 16 is increased when the potential level of the aperture control signal 40 from the operational amplifier 36 is increased. The light transmissivity of the electrochromic filter plate 16 is then decreased. Now assume that the actual object illuminance for the video camera in FIG. 1 is low. The object illuminance detection signal 35, which is supplied from the pickup tube 10 through the smoothing circuit 34 to the first input terminal of the operational amplifier 36, has a low potential level. Furthermore, when the actual object illuminance of light incident on the pickup tube 10 is so low that proper exposure cannot be performed, the object illuminance detection signal 35 has a potential level lower than that of the proper exposure reference signal 38. When the actual object illuminance corresponds to the illuminance $L_1$, the operational amplifier 36 generates an aperture control signal 40 which has a potential level $Vc = V_1$ as shown in the graph in FIG. 2A.

This aperture control signal 40 is supplied to the voltage comparator 46 and is compared with the reference voltage signal 50 from the reference voltage generator 48. Since the potential level of the aperture control signal 40 is set at $V_1$, the voltage comparator 46 then produces the comparison signal 52 having the low level $V_L$ as shown in the graph in FIG. 2C. This comparison signal 52 of low logic level $V_L$ is supplied to the analog switch 44. The movable contact of the analog switch 44 is then connected as indicated by solid line A in response to the signal 52. Therefore, the analog switch 44 prevents the aperture control signal 40 from being supplied to the electrochromic filter plate 16. The aperture control signal 40 is thus supplied only to the diaphragm mechanism 14. No voltage is applied across the electrochromic filter plate 16; its transmissivity is at the maximum level; and the electrochromic filter plate 16 is substantially transparent. The diaphragm mechanism 14 is operated to fully open the diaphragm, that is, to obtain the maximum aperture size in response to the aperture control signal 40 with a potential level $V_c = V_1$, as shown in the graph in FIG. 2B.

When the object illuminance is increased in this condition, the amount of light incident on the surface 10a through the lens 12 is increased. The potential level $V_c$ of the aperture control signal 40 from the operational amplifier 36 is increased. The diaphragm mechanism 14 is operated to close the diaphragm and to decrease the aperture size in response to the higher level control signal 40, as shown in the graph in FIG. 2B. Therefore, the intensity of light incident on the surface 10a of the pickup tube 10 is adjusted by the diaphragm mechanism 14, thus providing the proper or optimal exposure.

When the object illuminance is further increased to exceed a predetermined illuminance level $L_2$, the potential level of the aperture control signal 40 from the operational amplifier 36 exceeds the voltage $V_2$, as shown in the graph in FIG. 2A. When the potential level of the aperture control signal 40 is at $V_2$, the diaphragm mechanism 14 is operated to change the aperture size to the minimum aperture size (10% of the maximum aperture size), that is, to almost close the diaphragm. However, even if the potential level of the aperture control signal 40 is further increased, the aperture size of the diaphragm mechanism 14 is kept unchanged at the minimum aperture size. As a result, the diaphragm cannot be further closed to a pinhole-like state.

Figure 2C:
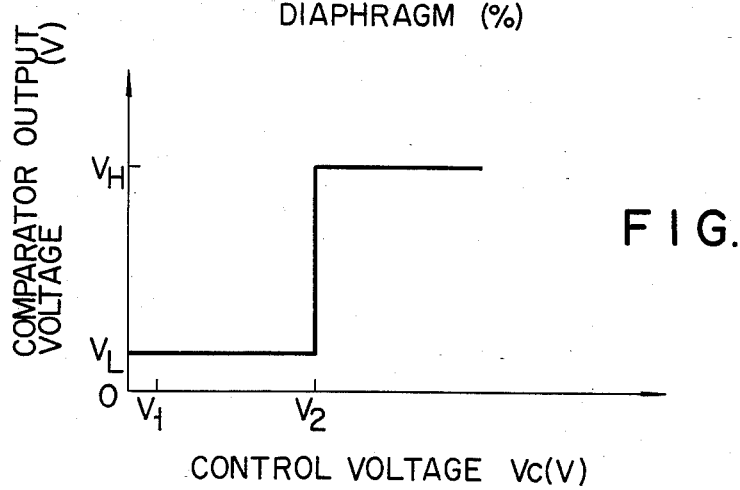
FIG. 2C is a graph for explaining the voltage comparator output as a function of the control voltage Vc of the aperture control signal.

When the potential level of the aperture control signal 40 exceeds the voltage $V_2$, the comparison signal 52 from the voltage comparator 46 has the high level $V_H$, as shown in the graph in FIG. 2C. The analog switch 44 which receives the signal 52 having the high level $V_H$ is switched in a manner as indicated by dotted line B in FIG. 1. The aperture control signal 40 is not only supplied to the diaphragm mechanism 14 but also to the electrochromic filter plate 16 through the analog switch 44. The electrochromic filter plate 16 is controlled in response to the aperture control signal 40 so as to change its light transmissivity in the manner described above, as shown in the graph in FIG. 4. In particular, when the actual object illuminance is increased and exceeds the reference illuminance level $L_2$, the diaphragm mechanism 14 is operated to maintain the minimum aperture size (10% of the maximum aperture size in this embodiment). Therefore, the amount of light incident on the pickup tube 10 is controlled and limited such that the light transmissivity of the electrochromic filter plate 16 is changed only in response to the level of the aperture control signal 40. Optimal exposure for the pickup tube 10 is then obtained.

Thereafter, when the object illuminance is decreased again, the color density of the electrochromic filter plate 16 is decreased, thus increasing its transmissivity. Furthermore, when the object illuminance level becomes lower than the illuminance level $L_2$, the potential level of the aperture control signal 40 becomes lower than the voltage $V_2$. Therefore, the comparison signal 52 from the voltage comparator 46 has a low level $V_L$, and the analog switch 44 is switched to prevent the control signal 40 from being supplied to the electrochromic filter plate 16. The exposure control operation or light amount control operation is only performed by the diaphragm mechanism 14 so as to adjust the amount of light incident on the surface 10a through the lens 12. Meanwhile, the electrochromic filter plate 16 maintains the immediately previous condition due to its memory characteristic even after supply of the aperture control signal 40 is interrupted. In other words, the electrochromic filter plate 16 is kept transparent after the analog switch 44 is switched, and as a result, maintains its maximum transmissivity.

When the object illuminace changes to exceed the predetermined reference illuminance level $L_2$, the aperture size of the diaphragm mechanism 14 is forcibly fixed at the predetermined aperture size. However, the amount of light incident on the pickup tube 10 is automatically controlled in accordance with a change in transmissivity of the electrochromic filter plate 16. Therefore, while the user observes the object through an electronic viewfinder (not shown) of the video camera shown in FIG. 1 and operates the video camera, proper focusing can be performed even if the object illuminance changes irregularly. The aperture size will not be decreased from the predetermined aperture size (for example, 10% of the maximum aperture size in the present embodiment) even if the object illuminance increases. As a result, the depth of field will not be increased from a predetermined value, thereby preventing the "pinhole effect". In other words, even if the illuminance of the moving object changes abruptly, good image quality can be obtained while keeping the object in focus. Furthermore, the component parts 36 and 42 of the aperture control circuit system will not become unstable and cause hunting when the object illuminance is increased. As a result, good image quality of a moving object can be always obtained even if the illuminance of the moving object changes abruptly.

Furthermore, since the electrochromic filter plate 16 is disposed between the diaphragm mechanism 14 and the surface 10a of the pickup tube 10 along the optical path, dust or the like in the atmosphere cannot settle on the surface 10a of the pickup tube 10 because of the presence of the electrochromic filter plate 16. Therefore, degradation of the image quality due to dust or the like can be prevented, thereby effectively improving the image quality.

Although the present invention has been shown and described with respect to a particular embodiment, nevertheless, various changes and modifications which are obvious to a person skilled in the art to which the invention pertains are deemed to lie within the spirit, scope and contemplation of the invention. For example, in the above embodiment, the pickup or camera tube is used as an image pickup element. A solid-state image pickup element can also be used. Furthermore, in the above embodiment, a video camera is exemplified. However, the present invention may also be applied to a movie camera which uses a photosensitive member to set a constant exposure time of the object. In this case, the same effect as in the embodiment can be obtained using an output from a photometer.

What we claim is:

1. An apparatus for picking up incident image light, comprising:
   (a) an image sensing element having an image pickup surface for receiving and sensing incident image light;
   (b) diaphragm means, responsive to an aperture control signal and disposed along an optical path of the image light incident on said image sensing element, for setting an aperture size from and including a first aperture size corresponding to a fully opened diaphragm state to and including a second aperture size corresponding to a predetermined lower limit diaphragm state which is no smaller than 2% of said fully opened diaphragm state, thereby controllably changing the amount of said image light incident on said image sensing element;

(c) filter means, disposed along said optical path of said image light incident on said image sensing element and having an electrochromic layer of an electrochromic material, for changing transmissivity of said electrochromic layer in accordance with said aperture control signal selectively applied thereto, thereby changing the amount of said image light incident on said image sensing element; and (d) exposure controlling means, selectively outputting said aperture control signal to said diaphragm means and said filter means to perform an exposure control operation with respect to said image sensing element, for only controlling said diaphragm means to set aperture size thereby performing said exposure control operation when illuminance of actual incident image light is smaller than a predetermined reference illuminance, and for controlling said diaphragm means to set and hold aperture size at said second aperture size and for controlling said filter means so as to change said transmissivity and thereby perform said exposure control operation when illuminance of actual incident image light is not less than said predetermined reference illuminance.

2. An apparatus according to claim 1, wherein said image sensing element comprises image sensor means for receiving incident image light and for producing an electrical image signal corresponding to illuminance of said incident image light.

3. An apparatus according to claim 2, wherein said exposure controlling means comprises:
   first circuit means, electrically connected to said image sensor means, for generating a detection signal indicating illuminance of said actual incident image light in accordance with said electrical image signal;
   second circuit means for generating a reference signal having a potential corresponding to a predetermined exposure illuminance level for obtaining an optimal exposure of said image sensor means; and
   third circuit means, connected to said first and second circuit means, for receiving said detection signal and said reference signal and for producing said aperture control signal to compensate for difference between said detection and reference signals.

4. An apparatus according to claim 3, wherein said diaphragm means is connected to said third circuit means so as to receive said aperture control signal, and continuously changes said aperture size between said first aperture size and said second aperture size in response to said aperture control signal.

5. An apparatus according to claim 3, wherein said diaphragm means is connected to said third circuit means so as to receive said aperture control signal, change aperture size thereof substantially in inverse proportion to signal level of said aperture control signal, change aperture size thereof to said second aperture size in response to an increasing signal level of said aperture control signal, and hold said aperture size thereof at said second aperture size regardless of said aperture control signal increasing beyond a predetermined signal level.

6. An apparatus according to claim 4, wherein said exposure controlling means further comprises fourth circuit means, electrically connected to said third circuit means, for supplying said aperture control signal to said diaphragm means when illuminance of said actual incident image light is smaller than said predetermined reference illuminance level and for allowing transmission of said aperture control signal to said filter means when illuminance of said actual incident image light is not less than said predetermined reference illuminance.

7. An apparatus according to claim 6, wherein said fourth circuit means includes:
   a reference voltage generating circuit for generating a second reference signal corresponding to said predetermined reference illuminance;
   a comparator circuit, connected to said third circuit means and said reference voltage generating circuit, for receiving and comparing said aperture control signal and said second reference signal to generate a comparison signal; and
   switching means, connected to said third circuit means, said comparator circuit and said filter means, for performing a switching operation in response to said comparison signal to thereby control transmission of said aperture control signal to said filter means.

8. An apparatus according to claim 1, wherein said filter means comprises:
   a transparent substrate;
   a first transparent conductive layer formed on a top surface of said transparent substrate;
   a first electrochromic layer of a first solid electrochromic material formed on said first transparent conductive layer;
   a second electrochromic layer of a second solid electrochromic material which is insulatively provided over said first electrochromic layer; and
   a second transparent conductive layer formed on said second electrochromic layer, said aperture control signal having a voltage component to be applied between said first and second transparent conductive layers.

9. An apparatus as in claim 1, wherein said second aperture size is selected within a range of 2 to 30% of the aperture size of said first aperture size.

10. An apparatus as in claim 9, wherein said second aperture size is 10% of said first aperture size.

11. A video recording camera comprising:
   (a) image sensing means for receiving incident image light and for producing an electrical image signal corresponding to said incident image light;
   (b) object illuminance detecting means, electrically connected to said image sensing means, for generating an electrical detection signal indicating an actual amount of said incident image light;
   (c) light amount controlling means, electrically connected to said object illuminance detecting means and responsive to said electrical detection signal, for producing an aperture control signal which indicates a change in an aperture size so as to set said image sensing means at an optimal exposure;
   (d) diaphragm means, disposed along an optical path of said incident image light on said image sensing means and responsive to said aperture control signal, for changing aperture size thereof between a maximum aperture size corresponding to a fully opened diaphragm state and a predetermined minimum aperture size which is no smaller than 2% of said maximum aperture size, thereby controlling the amount of said incident image light;

(e) electrochromic filter means, disposed between said diaphragm means and said image sensing means, for controlling transmissivity thereof in response to said aperture control signal, thereby controlling the amount of said incident image light; and (f) signal switching means, electrically connected between said light amount controlling means and said electrochromic filter means, for supplying said aperture control signal to only said diaphragm means when the amount of said incident image light falls in a first light amount range, and for supplying said aperture control signal to said electrochromic filter means when the amount of said incident image light falls in a second light amount range which is above said first light amount range while also causing said diaphragm means to hold said aperture size thereof at said minimum aperture size.

12. A video recording camera according to claim 11, wherein said signal switching means includes an analog switch circuit.

13. A video recording camera according to claim 11, wherein said light amount controlling means includes:
signal generating means for generating an electrical reference signal indicating an amount of light to set said image sensing means at optimal exposure; and
differential amplifier means, connected to said object illuminance detecting means and said signal generating means so as to receive said electrical detection signal and said electrical reference signal, for comparing said electrical detection signal and said electrical reference signal to thereby produce said aperture control signal.

14. A camera as in claim 11, wherein said minimum aperture size is selected within a range of 2 to 30% of the aperture size of said maximum aperture size.

15. A camera as in claim 14, wherein said minimum aperture size is 10% of said maximum aperture size.

* * * * *

UNITED STATES PATENT AND TRADEMARK OFFICE
CERTIFICATE OF CORRECTION

PATENT NO. : 4,554,587
DATED      : November 19, 1985
INVENTOR(S): Kazushige OOI, et al It is certified that error appears in the above-identified patent and that said Letters Patent is hereby corrected as shown below:

The address of assignee, Tokyo Shibaura Denki Kabushiki Kaisha, should read --Kawasaki-shi, Japan--

Signed and Sealed this

Thirteenth Day of January, 1987

Attest:

DONALD J. QUIGG

Attesting Officer    Commissioner of Patents and Trademarks